United States Patent [19]

Karwat

[11] Patent Number: 4,522,638

[45] Date of Patent: Jun. 11, 1985

[54] METHOD AND APPARATUS FOR REGULATING THE $NH_3$ CONTENT IN SCRUBBING LIQUID USED IN A GAS SCRUBBING PROCESS

[75] Inventor: Heinz Karwat, Pullach, Fed. Rep. of Germany

[73] Assignee: Linde AG, Hollriegelskreuth, Fed. Rep. of Germany

[21] Appl. No.: 612,885

[22] Filed: May 22, 1984

Related U.S. Application Data

[63] Continuation of Ser. No. 434,288, Oct. 14, 1984, abandoned.

[30] Foreign Application Priority Data

Oct. 21, 1981 [DE] Fed. Rep. of Germany ....... 3141772

[51] Int. Cl.$^3$ .............................................. C02F 1/72
[52] U.S. Cl. ......................................... 55/37; 55/48; 55/70; 55/73; 423/226; 423/238; 423/313; 423/550; 71/40; 71/41; 71/43
[58] Field of Search ................... 55/36, 37, 46, 48, 68, 55/70, 73, 228; 71/40, 41, 43; 210/702; 423/226, 227, 228, 237, 238, 549, 550, 312, 313

[56] References Cited

U.S. PATENT DOCUMENTS

| | | | |
|---|---|---|---|
| 3,115,390 | 12/1963 | Jadot | 71/43 |
| 3,396,003 | 8/1968 | Scheel | 71/43 |
| 3,484,192 | 12/1969 | Farr | 71/43 |
| 3,492,087 | 1/1970 | MacGregor | 71/43 |
| 3,920,419 | 11/1975 | Schroder | 55/70 |
| 3,985,523 | 10/1976 | Kaupas | 55/70 |
| 4,060,591 | 11/1977 | Garber | 55/70 |
| 4,076,515 | 2/1978 | Rickard | 55/70 |
| 4,093,544 | 6/1978 | Ross | 55/70 |
| 4,352,680 | 10/1982 | Hackler | 55/70 |
| 4,381,926 | 5/1983 | Karwat | 55/70 |

OTHER PUBLICATIONS

Betz Handbook of Industrial Water Conditioning, 1976, Trevose, Pa., p. 30.

Primary Examiner—Ernest G. Therkorn
Attorney, Agent, or Firm—James C. Wray

[57] ABSTRACT

A process for regulating the $NH_3$ content in an organic liquid that acts as a physical scrubbing agent and is used in a procedure for absorbing sour gases from gaseous mixtures. To ensure undisturbed and reliable carrying out of the scrubbing process, an ammonia-precipitating precipitant is added to the scrubbing agent and the precipitate is then separated from the scrubbing agent. Preferred precipitants include sulphuric acid and phosphuric acid. The ammonia salts are effective fertilizers.

9 Claims, 1 Drawing Figure

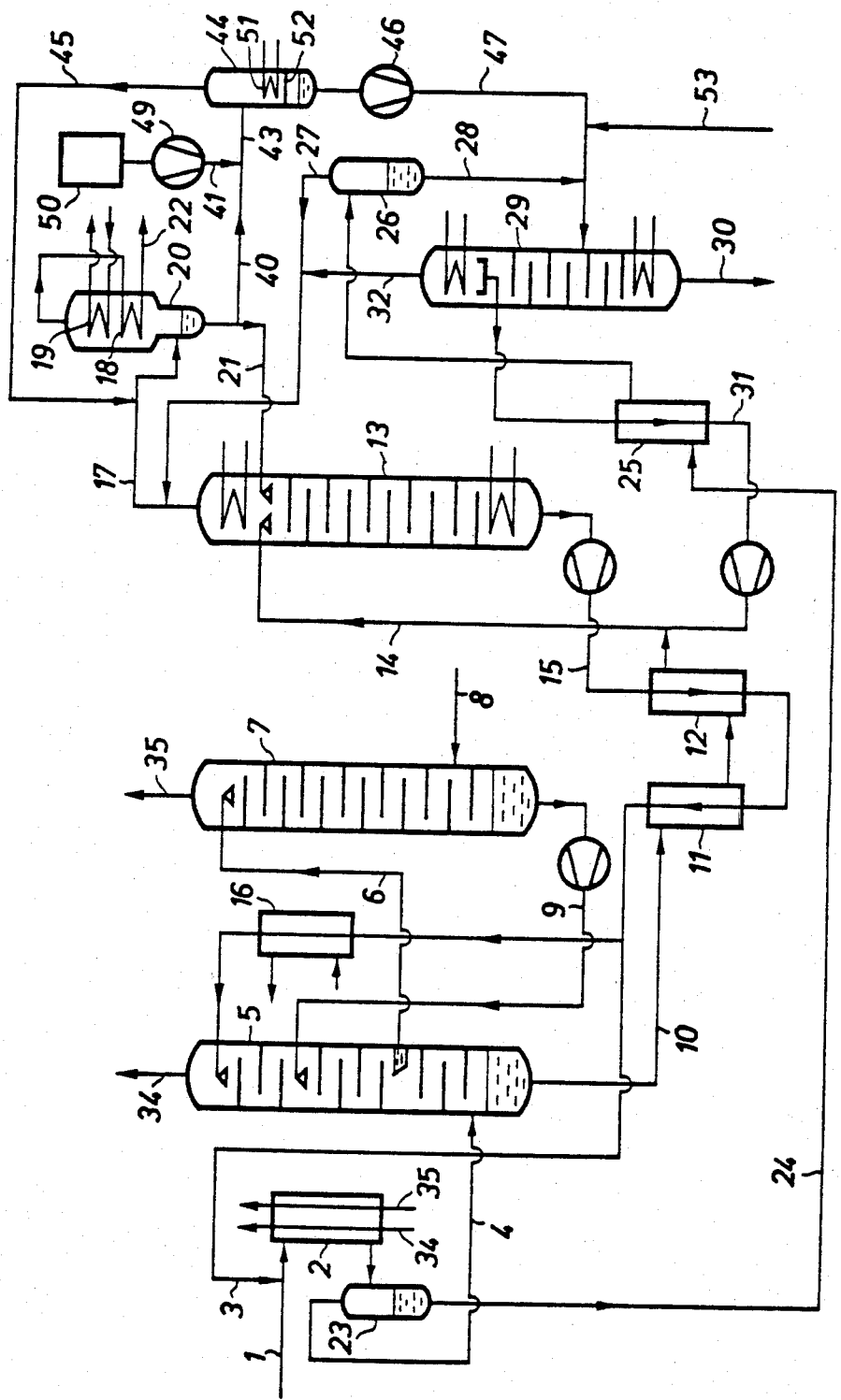

METHOD AND APPARATUS FOR REGULATING THE NH$_3$ CONTENT IN SCRUBBING LIQUID USED IN A GAS SCRUBBING PROCESS

This application is a continuation of application Ser. No. 434,288, filed Oct. 14, 1984, now abandoned.

BACKGROUND OF THE INVENTION

This invention relates generally to a process for regulating the NH$_3$ content of an organic liquid which is used as a physical scrubbing agent in a process for absorbing sour gases from gaseous mixtures and which is freed from the absorbed gaseous components after scrubbing and reused in the process circuit. The invention also relates to apparatus for implementing the process.

To produce refined gases from crude gases, the sour components, such as CO$_2$, H$_2$S and COS must be eliminated from the crude gases. Alcohols, glycols and ethers are known to be suitable for use in such a process. The methanol-scrubbing process has proven to be especially effective. In that process, the sour gases are eliminated with methanol under temperatures to below $-70°$ C. and pressures up to 80 bar.

The crude gas which has to be scrubbed often contains traces of ammonia which become concentrated in the methanol because of its high solubility in methanol. Such concentrations of ammonia can be desirable as explained in German Pat. No. DE OS 27 59 123. The German Patent discloses a known process in which ammonia is added in small amounts, i.e., 0.05 to 0.5 weight-%, to a physical scrubbing agent such as methanol or ethanol. The resultant mixture of scrubbing agent and ammonia produces a combined physical-chemical scrubbing activity which reduces the amount of scrubbing agent which must be used.

However, the above described process can only be used effectively if the ammonia concentrations can be kept constant and can be prevented from reaching excessive levels. If the concentration of ammonia in methanol becomes excessive in the presence of carbon dioxide, solid secretions of ammonia carbaminate can be formed in the pipelines and/or the desired temperature distribution in the system can be impaired by the reaction temperature of NH$_3$ with the sour gas components. Both of those factors can seriously disturb the scrubbing process.

German patent application No. P 30 36 936 describes a process for eliminating ammonia from methanol by means of an ion exchanger. One disadvantage with that process is that the apparatus needed for periodical regeneration of the ion exchanger is large. A further disadvantage is that there are additional accumulations of methanol-water mixture and waste water.

SUMMARY OF THE INVENTION

The present invention overcomes the problems which exist in the prior art.

The present invention provides a process which guarantees an undisturbed and reliable scrubbing process which uses a phycially active organic scrubbing agent to remove sour gases from gaseous mixtures.

In the present invention, a precipitation agent for ammonia is added to the scrubbing agent and the resultant precipitate is separated from the scrubbing agent.

The present invention thus provides a single step process for removing ammonia from the scrubbing liquid. Solid secretions of NH$_4$ and NH$_2$CO$_2$ in the pipe lines are avoided and the desired thermal distribution of the scrubbing circuit is not disturbed by heat of reaction from ammonia with carbon dioxide and hydrogen sulfide.

The use of acids as precipitants has proved to be especially effective. Well decantable, filterable and centrifugable precipitations occur. The scrubbing agent can be evaporated or dispersed in a gas stream if desired. Sulfuric acid has been found particularly useful for precipitation of ammonia. The precipitated ammonium sulfate can be easily separated from the scrubbing agent by filtering or decanting and may be taken from the filter, decanter or centrifuge as a solid or as a solution after addition of water. The separated ammonium sulfate can then be used for further environmental applications, such as for fertilizer. Similar advantages can be obtained with the use of phosphoric acid. Nitric acid and halogen-hydrogen-acids or organic acids can be used as precipitates if ammonium salts are desired.

Satisfactory results in the extraction of sour gases can be obtained if the ammonia concentration in the circulating scrubbing liquids are held within the range of 300–2,000 mg/kg, preferably 500–1,000 mg/kg. Hence, it is convenient if precipitant is added to only a portion of the circulating scrubbing agent.

In accordance with a further aspect of the present invention, it is desired that the precipitation of ammonia occur at a temperature in the range of 0°–60° C., preferably in the range of 10°–50° C. It is beneficial to chill the scrubbing agent, which will contain products of the reaction, after the precipitation to temperatures in the range of 0° to $-95°$ C., preferably 0° to $-40°$ C. to complete the precipitation.

The present invention further provides apparatus for carrying out the above described process including a scrubbing column and at least one regeneration column which is characterized by an acid container, an acid dosage pump and a separating device, such as a decanting container, a filter, a centrifuge or an evaporation device.

These and other and further objections and features of the invention are apparent in the disclosure which includes the above and below specification and claims and drawings.

BRIEF DESCRIPTION OF THE DRAWINGS

The FIGURE is a schematic diagram of apparatus used in carrying out the present invention.

DETAILED DESCRIPTION OF THE DRAWINGS

Although the present invention will be described with reference to the use of methanol to purify a crude gas, it is understood that the invention is not limited to a methanol scrubbing process but can be used in processes using other scrubbing agents such as alcohols, glycols or ethers.

100,000 Nm$^3$/h crude gas to be purified is introduced on line 1. The gas has a temperature of approximately 30° C. and a pressure of about 70 bar. The gas consists mainly of H$_2$ and CO$_2$ but also contains CO, H$_2$S, and 80 kg/h water, and traces of NH$_3$ (10 vppm).

The crude gas is introduced into a precooling device 2. In the precooling device, the gas, which is saturated with water, is chilled to about $-30°$ C. The chilling is accomplished by passing recirculated gas fractions through the ducts 34 and 35. Those gas fractions will be described later in detail.

To prevent ice obstruction in the precooling device 2, 160 kg/h methanol which is extracted from a following methanol regenerating column 13 is injected into the pre-cooling device 2 through a duct 3.

The precooled crude gas is communicated through a depositing device 23 and a duct 4 to a methanol scrubbing column 5. The column 5 removes the sour components $CO_2$ and $H_2S$ from the crude gas. In the lower part of the column 5, the sulfur compounds are absorbed with a methanol portion. Coarse absorption with methanol occurs in the middle part of the column 5 and fine absorption occurs in the upper part of the column 5. Partially regenerated methanol is used in the scrubbing which occurs in the middle part of the column 5 and totally regenerated methanol is used in the scrubbing which occurs in the upper part of the column 5. Purified gas flows through outlet duct 34 to the precooling device 2 and is then extracted for further usage.

The $CO_2$-containing methanol is led through a duct 6 to a regenerating column 7 where it is freed from the $CO_2$ by stripping with an auxiliary gas which is introduced through a duct 8. The freed methanol is recirculated through a duct 9 into the scrubbing column 5. The freed gases, mainly $CO_2$ and strip gas, are led away from the top of the column 7 and flow through a duct 35 into the precooling device 2.

The methanol, which contains $H_2S$ and $CO_2$ and which accumulates in the bottom of the scrubbing column 5, is communicated through a duct 10 and heat exchangers 11 and 12 to a regenerating column 13. The methanol is warmed to approximately ambient temperature in the heat exchanger 11 and is warmed to approximately 65° C. in the heat exchanger 12 and is then communicated through a duct 14 into the regenerating column 13. The methanol is totally degasified by boiling in the column 13. The regenerated methanol is extracted from the bottom of the column 13 through a duct 15. The extracted methanol is cooled to 30° C. in the heat exchanger 12 and is then cooled to $-10°$ C. in the heat exchanger 11. After further cooling to about $-40°$ C. in a refrigerating agent evaporator 16, the methanol is returned to the scrubbing column 5.

The $H_2S$-$CO_2$ fraction which is extracted from the top of the regenerating column 13 is passed along a duct 17 into a heat exchanger 18 where it is cooled by means of counter flow. The fraction is cooled to $-40°$ C. by the refrigerating agent evaporator 19, whereby the methanol which is contained therein condenses out and accumulates in an extracting device 20. The condensate is fed back to the regenerating column 13 through a duct 21. The $CO_2$-$H_2S$ fraction is vented through a duct 22.

The cold ($-30°$ C.) methanol which was injected into the pre-cooling device 2 and saturated with water, is removed from the extraction device 23 through a duct 24 and, after warming to ambient temperature by water flow in a heat exchanger 25, is then communicated to an extraction device 26 where the majority of the dissolved gases, especially $O_2$, are separated by relaxation to 2 bar. These gases are communicated through a duct 27 and mixed with the $CO_2$-$H_2S$ fraction from the regenerating column 13. The mixture of methanol and water is extracted through a duct 28 and communicated to a water-methanol separation column 29 which is heated by vapor and cooled by water. Water is extracted at the bottom of the separation column 29 through a duct 30 and methanol is extracted at the top of the column 29 through a duct 31. The extracted methanol passes through the heat exchanger 25 and is then led into the methanol regenerating column 13. Inert gases are vented from the separation column 29 through duct 32.

Ammonia which is carried along with the crude gas partially dissolves in the injected methanol at the precooling device 2 and is communicated therewith through the duct 24 to the methanol-water separation column 29. In the column 29, ammonia is removed by heating and is communicated with the methanol injected into the scrubbing cycle through the duct 31. However, another part of the ammonia stays with the crude gas and is communicated to the scrubbing column 5 where it is dissolved in the scrubbing methanol during the scrubbing cycle and is concentrated. From there, the ammonia enters, according to its content as a gaseous component in the scrubbing methanol, into the separating device 20 through the regenerating column 13, in the top of which an additional local concentration of ammonia occurs in a gaseous phase and liquid phase.

The ammonia combines with the $CO_2$ which is contained in the $CO_2$-$H_2S$ fraction to form ammonia carbaminate which precipitates in the heat exchanger 19 as a solid precipitate. Hence, the ammonia has to be limited to such a concentration in the scrubbing methanol that no solid ammonia carbaminate can be precipitated.

Therefore, according to the invention, a part of the flow, 84.4 l/h which contains 49.6 gmol $NH_3$, is taken away from the methanol which is extracted from the separating device 20 (25° C., 10 g $NH_3$/1, 0, 8 g $H_2O$/1) and is passed along a duct 40. 1.4 l/h sulfuric acid (i.e., 94.7 weight percent) is pumped from a storage bin 50 by a dosing pump 49 and is passed through a duct 41 into the flow of methanol in duct 40 in such a way that a mixture of both flows occurs in the mixture duct 43. The sulfuric acid reacts with the ammonia immediately, causing precipitation of crystalline ammonia sulfate. Heat release by the neutralization of ammonia warms the methanol to approximately 44° C. In that way, and by avoidance of significant surplus of sulfuric acid, there will be no reaction between the sulfuric acid and the methanol.

Equivalent amounts of $CO_2$ and $H_2S$ (approximately 0.5 $Nm^3$/h) are released from the $NH_3$-containing methanol in separation apparatus 44 by the addition of the acid. The separation device 44 is build as a device for precipitation. The equivalent amounts of $CO_2$ and $H_2S$ are brought back into duct 17 through a duct 45. These degasifying $CO_2$ and $H_2S$ may also be led directly into the lower part of the extracting device 20, if desired.

The methanol-salt mixture which is present in the precipitation device 44 is cooled to 0° C. by a refrigeration agent passing through a cooling element 51. The cooling precipitates an additional amount of the ammonia sulfate which is dissolved in the methanol.

The lower part of the precipitation device 44 has a porous bottom 52, i.e., a sintered metal agglomerate, which acts as a filter and separates the precipitated salt (2.95 kg/h) from the methanol. It is also possible to separate the salt-fluid mixture from the precipitation device 44 by a filter press. The methanol is extracted by a pump 46 and passed through a duct 47 which is connected to the intake pipe 28 to the methanol-water separating column 29. The methanol in the duct 47 is made alkaline by the addition of an alkali, i.e., soda lye, alkaline hydroxide or alkaline carbonate solution, through a duct 53. The sulfate and sodium ions leave the methanol-water separating column 29 together with the H$_2$S fraction, followed by precipitation of ammonious salt from the gas flow.

TABLE

| Flow of Methanol | A | A | A | B | B | C | C |
|---|---|---|---|---|---|---|---|
| Content of NH$_3$ (g/l) | 10 | 10 | 10 | 5.2 | 5.2 | 7.8 | 7.8 |
| Content of water (weight %) | <1 | <1 | 1 | 30 | 30 | 30 | 30 |
| Temperature | 0 | −22 | +18 | 0 | −22 | +20 | −22 |
| Precipitation as | sulfate | sulfate | phosphate | sulfate | sulfate | phosphate | phosphate |
| Degree of Precipitation of NH$_3$ (%) | 90 | 93 | >98 | 50 | 74 | 90 | 94 | water at the bottom of the column 29 while the NH$_4$+ ions leave through the top of the column 29 with the methanol.

The methanol which is removed through the duct 40 is freed from 90% of the NH$_3$ by the herein chosen conditions. The 10 ppm NH$_3$ ($\triangleq$1 Nm$^3$/H$\triangleq$760 g/h) which enters with the crude gas are 100% precipitated as crystalline ammonia sulfate. The methanol in the precipitation device 44 is cooled to a lower temperature, i.e., −22° C., or is an aquaous methanol, i.e., through duct 28, for example, alternatively with phosphoric acid heated according to the invention so that the data shown in the table will result for the ammonia from the methanol. The decreasing degree of precipitation by increasing amounts of water of the methanol is compensated by lowering the temperature of the solution.

The precipitated ammonia sulphate may be taken out of the precipitation device 44 either as a solid component, e.g., by exchanging the precipitation device 44, or it can be flushed out with the aid of a water solution. The latter procedure is advantageous from the standpoint of automation.

The present invention is not limited to the system shown in the FIGURE. The precipitation of ammonia can take place at any appropriate point in the system. For example, it could take place in the outflow of the regenerating column 13 in duct 15 after the heat exchanger 12. There, however, the degasification of H$_2$S and CO$_2$ is relatively unimportant. The methanol which is substantially free of ammonia may be led to the methanol-water separation column 29.

Separation of precipitated salts from the scrubbing agent is not limited to a filtering process. It is possible to separate the salts from the scrubbing agent by centrifugal refining or by decantation. Alternatively, the scrubbing agent can be evaporated or sprayed into a gas flow, for example, the crude gas, the stripping nitrogen or the While the invention has been described with reference to specific embodiments, the exact nature and scope of the invention is defined in the following claims.

I claim:

1. A process for regulating the NH$_3$ content of an organic liquid which acts as a physical scrubbing agent and is used in a procedure for removing sour gases from gaseous mixtures, said liquid being freed from the absorbed gaseous components after the scrubbing procedure and being reused in the circuit, comprising adding an acid precipitant to the scrubbing agent to precipitate ammonia salts therefrom and separating the resultant precipitant from the scrubbing agent, further comprising cooling the scrubbing agent after precipitation to a temperature in the range of about 0° to −95° C., preferably 0° to −40°, said scrubbing agent containing reaction products, ammonia being removed from the scrubbing agent to the extent of leaving a residue of 300–2000 mg/kg, preferably 500–1000 mg/kg, which combines with the scrubbing agent to enchance scrubbing effectiveness.

2. The process of claim 1 wherein precipitant is added to only a portion of the scrubbing agent in the circuit.

3. The process of claim 1 wherein the precipitant comprises sulphuric acid.

4. The process of claim 1 wherein the precipitant comprises phosphoric acid.

5. The process of claim 1 wherein the precipitate is removed from the scrubbing agent by decanting.

6. The process of claim 1 wherein the precipitate is removed from the scrubbing agent by filtering.

7. The process of claim 1 wherein the precipitate is removed from the scrubbing agent by centrifuging.

8. The process of claim 1 wherein the step of separating the precipitate comprises evaporating the scrubbing agent.

9. The process of claim 1 wherein the ammonia is precipitated at temperatures in the range of about 0°–60° C., preferably in the range of 10°–50° C.

* * * * *